(No Model.)

J. H. CLOYES.
TOP PROP.

No. 282,611. Patented Aug. 7, 1883.

Witnesses.
A. Ruppert.
L. A. Marceron

Inventor.
James H. Cloyes,
J. R. Nottingham
Asso. Atty

UNITED STATES PATENT OFFICE.

JAMES H. CLOYES, OF CORTLAND, NEW YORK, ASSIGNOR OF ONE-HALF TO CALEB B. HITCHCOCK, OF SAME PLACE.

TOP-PROP.

SPECIFICATION forming part of Letters Patent No. 282,611, dated August 7, 1883.

Application filed June 7, 1883. (No model.)

*To all whom it may concern:*

Be it known that I, JAMES H. CLOYES, a citizen of the United States, residing at Cortland, in the county of Cortland and State of New York, have invented certain new and useful Improvements in Top-Prop Supports, of which the following is a specification, reference being had therein to the accompanying drawings.

My invention relates to certain improvements in carriage-top-prop bolts; and the novelty consists in the construction and arrangement of parts, as will be more fully hereinafter set forth, and specifically pointed out in the claims.

The device is especially adapted for service in holding the top joints in the outside of carriage-tops; and the essential object of the invention is to provide such construction that the bearing for the brace shall be sufficiently strong, while the portion of the bolt which passes through the bow shall be so relatively small as not to materially weaken the said bow, but at the same time afford a firm and secure attachment thereto.

To this end the invention consists of a polygonal-shaped central bearing adapted by its surface formation to receive a wrench, and terminating at each end in a screw-threaded bolt, and of a suitable nut provided with spurs adapted to be secured on one of said ends, as fully illustrated in the accompanying drawings, which form a part of this specification, and in which—

Figure 1:
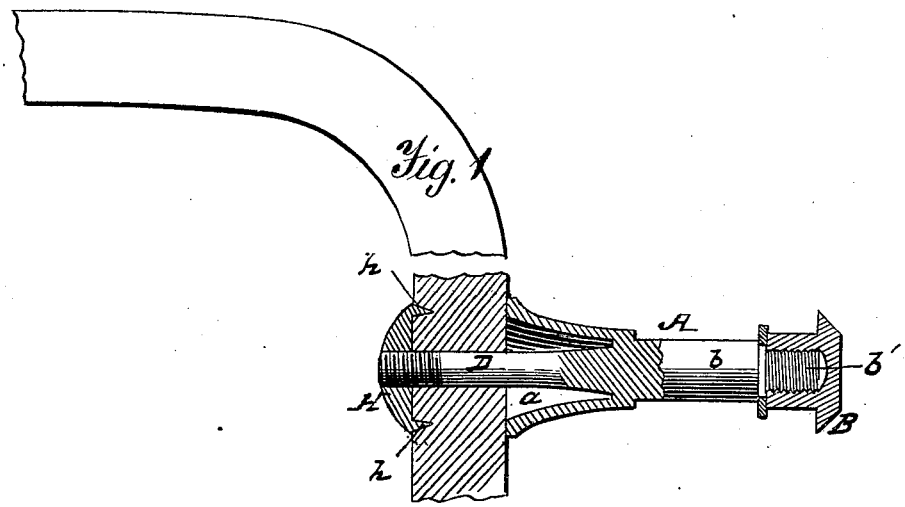
Figure 2:
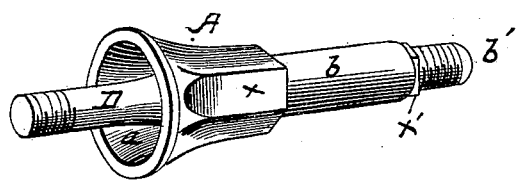
Figure 3:
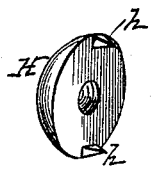

Figure 1 represents a sectional view of the device attached to the carriage-bow; Fig. 2, a perspective view of the prop with the nuts detached, and Fig. 3 a perspective view of the bow cap-nut.

Referring to the drawings, in which similar letters of reference indicate like parts in all the figures, A represents the body of the bolt, specific portions of which are designated by different letters. This body is formed into a bell-shaped portion, $a$, having polygonal surface, and is provided at one end with prop-shaft $b$, which terminates in the threaded portion $b'$, which receives an ordinary securing-nut, B, as shown; and it is further provided with a threaded shank, D, properly made of smaller diameter than the prop-shaft $b$, which shank D passes through a corresponding aperture or perforation in the said bow, and is adapted to be screwed into a cap-nut, H, having inwardly-projecting spurs $h$, as shown. The bell-shaped portion $a$ is provided with square or polygonal surface $x$ to receive a wrench, and proper washers may be provided to protect the nut B from friction by the oscillations of the top frame. The prop-shaft $b$ at the point next to its threaded portion $b'$ has its faces squared, as shown at $x'$, the object being to prevent the washers provided with correspondingly-squared apertures from turning. The bell-shaped portion $a$ is a part of the body-bolt A, rigidly secured to the other parts thereof.

It will be observed that the bell-shaped portion $a$ constitutes a double bearing, the end next to the prop-shaft $b$ serving as a bearing to the brace-joints at their connections with said prop, and the end next to shank D serving as a bearing against the outer surface of the bow.

As heretofore constructed the head which bears against the inner surface of the bow has been a part of the bolt, and the bearing bell-shaped portion, the equivalent part to $a$ in my illustration, has been a nut turned upon threads, and the prop-shaft $b$ has passed through the perforation in the said bow. This construction not only necessitated a perforation in the bow of at least the size of the said prop-shaft, which would seriously weaken the bow, but also necessitated the use of a jam-nut working on threads, and the shank to bear against the outer side or face of the bow to hold the bolt firmly thereto. Such jam-nut and shank would be the equivalents of my parts $a$ and D, respectively.

By my invention I avoid the necessity of weakening the bow, principally for the reason that I do not pass the prop-shaft $b$ through it, and that I do not arrange the bearing, which is rigid with the bolt, to operate on the inside of the bow, but on the outside. The shank D of the bolt may then be made very small—say one-quarter inch—as the metal will stand a very great pulling strain, and by my arrangement of bearing-surfaces on the bow but very slight wrenching strain is met with.

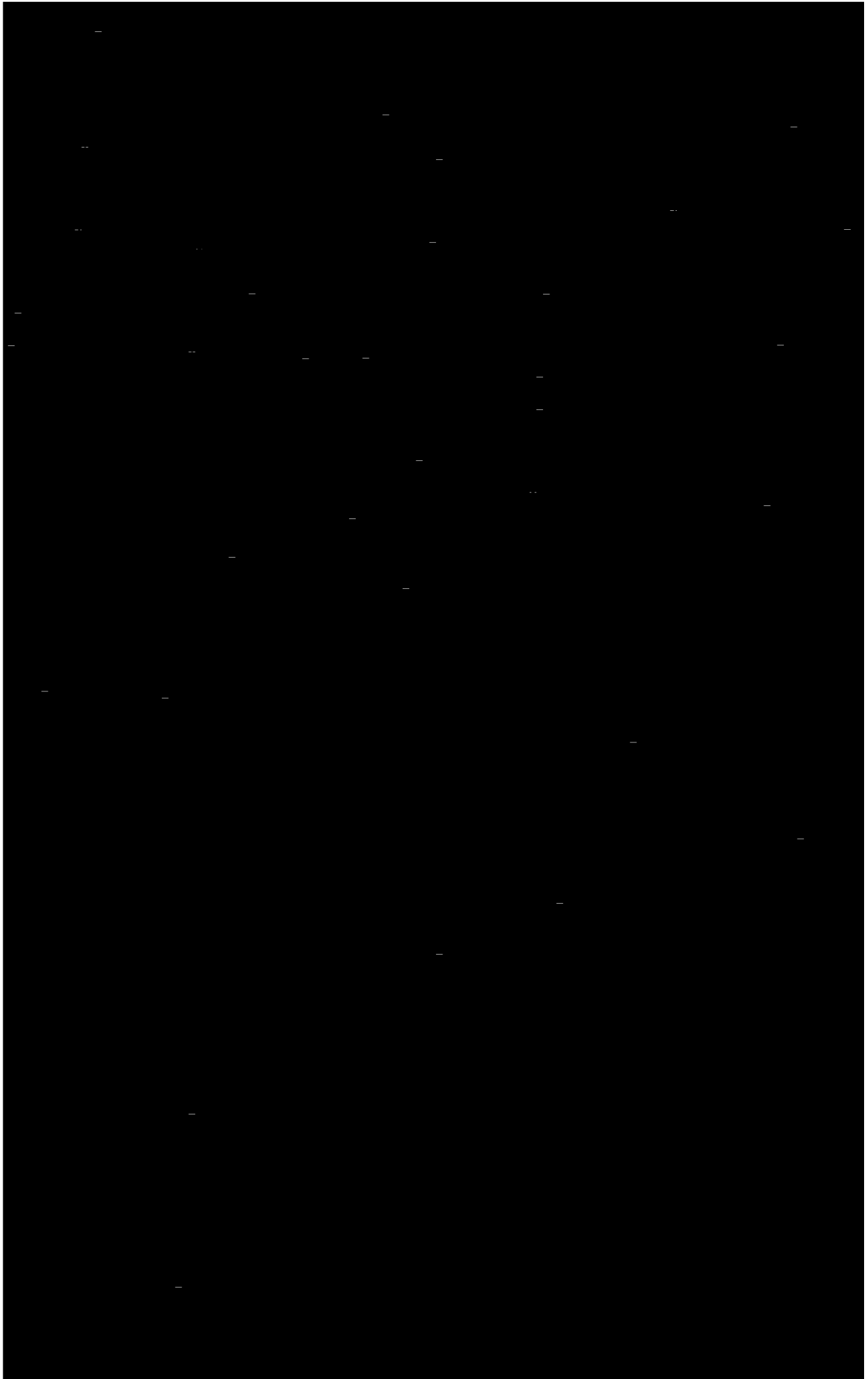

In practice the cap-nut H is placed upon the